United States Patent
Brown et al.

(10) Patent No.: US 9,398,023 B2
(45) Date of Patent: *Jul. 19, 2016

(54) SERVER VERIFICATION OF SECURE ELECTRONIC MESSAGES

(71) Applicant: BlackBerry Limited, Waterloo (CA)

(72) Inventors: Michael K. Brown, Fergus (CA); Michael S. Brown, Kitchener (CA); Neil P. Adams, Waterloo (CA); Michael G. Kirkup, Waterloo (CA); Herbert A. Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,854

(22) Filed: Jul. 27, 2015

(65) Prior Publication Data

US 2015/0334120 A1    Nov. 19, 2015

Related U.S. Application Data

(63) Continuation of application No. 10/914,634, filed on Aug. 10, 2004, now Pat. No. 9,094,429.

(51) Int. Cl.
*H04L 9/32* (2006.01)
*H04L 29/06* (2006.01)
(Continued)

(52) U.S. Cl.
CPC .............. *H04L 63/12* (2013.01); *H04L 9/3236* (2013.01); *H04L 12/583* (2013.01); *H04L 51/063* (2013.01); *H04W 12/10* (2013.01); *H04L 12/5895* (2013.01)

(58) Field of Classification Search
CPC .... H04L 12/583; H04L 51/063; H04W 12/10

USPC .......................................................... 713/170
See application file for complete search history.

(56) References Cited

U.S. PATENT DOCUMENTS

| | | |
|---|---|---|
| 4,028,500 A | 6/1977 | McClure et al. |
| 5,410,602 A | 4/1995 | Finkelstein et al. |

(Continued)

FOREIGN PATENT DOCUMENTS

| | | |
|---|---|---|
| CA | 2371329 | 11/2000 |
| CA | 2476914 | 2/2006 |

(Continued)

OTHER PUBLICATIONS

Gong et al. Multicast Security and its Extension to a Mobile Environtment, SRI International, Computer Science Laboratory, 1995, p. 285-295.

(Continued)

*Primary Examiner* — Teshome Hailu
(74) *Attorney, Agent, or Firm* — Integral IP; Miriam Paton; Amy Scouten

(57) ABSTRACT

Systems and methods for processing encoded messages within a wireless communications system are disclosed. A server within the wireless communications system determines whether the size of an encoded message is too large for a wireless communications device. If the message is too large, the server removes part of the message and sends an abbreviated message to the wireless device, together with additional information relating to processing of the encoded message, such as, for example, hash context values, that assist the wireless communications device in verifying the abbreviated message.

17 Claims, 6 Drawing Sheets

(51) Int. Cl.
*H04L 12/58* (2006.01)
*H04W 12/10* (2009.01)

(56) References Cited

U.S. PATENT DOCUMENTS

| | | | |
|---|---|---|---|
| 5,457,748 A | 10/1995 | Bergum et al. | |
| 5,623,546 A | 4/1997 | Hardy et al. | |
| 5,666,530 A | 9/1997 | Clark et al. | |
| 5,710,922 A | 1/1998 | Alley | |
| 5,727,202 A | 3/1998 | Kucala | |
| 5,764,774 A * | 6/1998 | Liu | H04L 9/00 235/435 |
| 5,778,068 A | 7/1998 | Johnson et al. | |
| 5,778,346 A | 7/1998 | Frid-Nielsen | |
| 5,812,671 A | 9/1998 | Ross | |
| 5,870,030 A | 2/1999 | DeLuca et al. | |
| 5,956,707 A | 9/1999 | Chu | |
| 5,991,399 A | 11/1999 | Graunke et al. | |
| 6,000,000 A | 12/1999 | Hawkins | |
| 6,061,448 A | 5/2000 | Smith et al. | |
| 6,073,237 A | 6/2000 | Ellison | |
| 6,081,601 A | 6/2000 | Raivisto | |
| 6,084,969 A | 7/2000 | Wright et al. | |
| 6,085,323 A | 7/2000 | Shimizu et al. | |
| 6,108,788 A | 8/2000 | Moses et al. | |
| 6,119,228 A * | 9/2000 | Angelo | H04L 41/28 380/255 |
| 6,125,369 A | 9/2000 | Wu et al. | |
| 6,209,098 B1 | 3/2001 | Davis | |
| 6,219,694 B1 | 4/2001 | Lazaridis | |
| 6,229,894 B1 | 5/2001 | Van Oorschot | |
| 6,230,186 B1 | 5/2001 | Yaker | |
| 6,231,985 B1 | 5/2001 | Chen et al. | |
| 6,266,420 B1 | 7/2001 | Langford et al. | |
| 6,266,775 B1 | 7/2001 | Kamba | |
| 6,289,105 B1 | 9/2001 | Murota | |
| 6,301,658 B1 | 10/2001 | Koehler | |
| 6,313,732 B1 | 11/2001 | DeLuca et al. | |
| 6,314,190 B1 | 11/2001 | Zimmermann | |
| 6,348,972 B1 | 2/2002 | Taniguchi et al. | |
| 6,389,455 B1 | 5/2002 | Fuisz | |
| 6,463,463 B1 | 10/2002 | Godfrey | |
| 6,531,985 B1 | 3/2003 | Jones et al. | |
| 6,564,320 B1 | 5/2003 | de Silva et al. | |
| 6,661,927 B1 * | 12/2003 | Suarez | H04N 19/63 375/240.11 |
| 6,697,942 B1 | 2/2004 | L'Heureux et al. | |
| 6,725,262 B1 | 4/2004 | Choquier et al. | |
| 6,732,144 B1 | 5/2004 | Kizu et al. | |
| 6,745,024 B1 | 6/2004 | DeJaco et al. | |
| 6,779,115 B1 | 8/2004 | Naim | |
| 6,819,766 B1 | 11/2004 | Weidong | |
| 6,829,357 B1 * | 12/2004 | Alrabady | H04L 9/0656 380/260 |
| 6,904,521 B1 | 6/2005 | Jivsov | |
| 6,918,038 B1 | 7/2005 | Smith et al. | |
| 6,925,568 B1 | 8/2005 | Heinonen | |
| 6,931,532 B1 | 8/2005 | Davis et al. | |
| 6,983,367 B2 | 1/2006 | Go et al. | |
| 6,993,137 B2 | 1/2006 | Fransdonk | |
| 6,996,720 B1 | 2/2006 | DeMello et al. | |
| 7,003,667 B1 | 2/2006 | Slick et al. | |
| 7,020,708 B2 | 3/2006 | Nelson et al. | |
| 7,028,186 B1 | 4/2006 | Stenman et al. | |
| 7,032,240 B1 | 4/2006 | Cronce et al. | |
| 7,113,927 B1 | 9/2006 | Tanaka et al. | |
| 7,127,604 B2 * | 10/2006 | Lide | H04L 9/0643 709/221 |
| 7,171,552 B1 | 1/2007 | Bell | |
| 7,228,418 B1 * | 6/2007 | Girault | H04L 9/3218 713/170 |
| 7,254,712 B2 * | 8/2007 | Godfrey | G06Q 10/107 380/270 |
| 7,299,502 B2 | 11/2007 | Schmeling et al. | |
| 7,529,374 B2 | 5/2009 | Huttunen | |
| 7,546,453 B2 | 6/2009 | Little et al. | |
| 7,653,815 B2 | 1/2010 | Godfrey et al. | |
| 7,657,736 B2 | 2/2010 | Godfrey et al. | |
| 7,827,406 B2 | 11/2010 | Brown et al. | |
| 8,015,400 B2 | 9/2011 | Little et al. | |
| 2001/0011308 A1 | 8/2001 | Clark et al. | |
| 2001/0029581 A1 * | 10/2001 | Knauft | G06F 21/10 713/193 |
| 2001/0046307 A1 * | 11/2001 | Wong | G06T 1/0035 382/100 |
| 2001/0050990 A1 | 12/2001 | Sudia | |
| 2002/0007453 A1 | 1/2002 | Nemovicher | |
| 2002/0032861 A1 | 3/2002 | Azuma | |
| 2002/0035685 A1 | 3/2002 | Ono et al. | |
| 2002/0035687 A1 | 3/2002 | Skantze | |
| 2002/0038420 A1 | 3/2002 | Collins et al. | |
| 2002/0051544 A1 | 5/2002 | Kikuchi et al. | |
| 2002/0053023 A1 | 5/2002 | Patterson et al. | |
| 2002/0053032 A1 | 5/2002 | Dowling et al. | |
| 2002/0059375 A1 | 5/2002 | Pivowar et al. | |
| 2002/0059383 A1 * | 5/2002 | Katsuda | G06Q 10/107 709/206 |
| 2002/0080752 A1 | 6/2002 | Johansson et al. | |
| 2002/0099766 A1 | 7/2002 | Tuli | |
| 2002/0147905 A1 | 10/2002 | Perlman | |
| 2002/0165967 A1 | 11/2002 | Morgan | |
| 2002/0169954 A1 | 11/2002 | Bandini et al. | |
| 2002/0173295 A1 | 11/2002 | Nykanen et al. | |
| 2002/0176067 A1 | 11/2002 | Charbon | |
| 2003/0002671 A1 | 1/2003 | Inchalik et al. | |
| 2003/0041242 A1 * | 2/2003 | Patel | H04L 9/3242 713/170 |
| 2003/0074555 A1 | 4/2003 | Fahn et al. | |
| 2003/0126085 A1 | 7/2003 | Srinivasan | |
| 2003/0172122 A1 | 9/2003 | Little et al. | |
| 2003/0198350 A1 | 10/2003 | Foster et al. | |
| 2003/0212888 A1 | 11/2003 | Wildish et al. | |
| 2004/0083364 A1 | 4/2004 | Andreaux et al. | |
| 2004/0093493 A1 | 5/2004 | Bisbee et al. | |
| 2004/0133520 A1 | 7/2004 | Callas et al. | |
| 2004/0133775 A1 | 7/2004 | Callas et al. | |
| 2004/0171369 A1 | 9/2004 | Little et al. | |
| 2004/0196978 A1 | 10/2004 | Godfrey et al. | |
| 2004/0202327 A1 | 10/2004 | Little et al. | |
| 2004/0205248 A1 | 10/2004 | Little et al. | |
| 2005/0005097 A1 | 1/2005 | Murakawa | |
| 2005/0039100 A1 | 2/2005 | Bade et al. | |
| 2005/0114671 A1 * | 5/2005 | Little | H04L 12/583 713/182 |
| 2005/0148323 A1 | 7/2005 | Little et al. | |
| 2005/0149442 A1 | 7/2005 | Adams et al. | |
| 2005/0163320 A1 | 7/2005 | Brown et al. | |
| 2005/0188219 A1 | 8/2005 | Annic et al. | |
| 2005/0203855 A1 | 9/2005 | Malcolm | |
| 2005/0210289 A1 | 9/2005 | Brown et al. | |
| 2005/0222991 A1 | 10/2005 | Ikenoya | |
| 2005/0246763 A1 | 11/2005 | Corcoran et al. | |
| 2006/0015722 A1 | 1/2006 | Rowan et al. | |
| 2006/0036848 A1 | 2/2006 | Brown et al. | |
| 2006/0036849 A1 | 2/2006 | Brown et al. | |
| 2006/0036865 A1 | 2/2006 | Brown et al. | |
| 2006/0059332 A1 | 3/2006 | Adams et al. | |
| 2007/0083749 A1 | 4/2007 | Fang | |
| 2007/0118874 A1 | 5/2007 | Adams et al. | |
| 2007/0123307 A1 | 5/2007 | Adams et al. | |
| 2007/0165844 A1 | 7/2007 | Little | |
| 2007/0165865 A1 * | 7/2007 | Talvitie | H04L 63/0428 380/286 |
| 2008/0016359 A1 | 1/2008 | Godfrey et al. | |
| 2009/0292916 A1 | 11/2009 | Little et al. | |
| 2010/0115264 A1 | 5/2010 | Godfrey et al. | |
| 2010/0122089 A1 | 5/2010 | Godfrey et al. | |
| 2010/0124333 A1 | 5/2010 | Godfrey et al. | |

FOREIGN PATENT DOCUMENTS

| | | |
|---|---|---|
| EP | 0500222 A1 | 8/1992 |
| EP | 0500245 A2 | 8/1992 |
| EP | 0841770 A2 | 5/1998 |

(56) References Cited

FOREIGN PATENT DOCUMENTS

| | | |
|---|---|---|
| EP | 0942568 A2 | 9/1999 |
| EP | 1096725 A2 | 5/2001 |
| EP | 1096727 A2 | 5/2001 |
| EP | 1580953 A1 | 9/2005 |
| EP | 1806683 A1 | 7/2007 |
| GB | 2328125 A | 2/1999 |
| JP | 64-22992 | 1/1989 |
| JP | 06-276221 | 9/1994 |
| JP | 07-162407 | 6/1995 |
| JP | 7-509333 | 10/1995 |
| JP | 8251221 | 9/1996 |
| JP | 09-046330 | 2/1997 |
| JP | 10-107832 | 4/1998 |
| JP | 11272581 | 10/1999 |
| JP | 11272582 | 10/1999 |
| JP | 10-175114 | 1/2000 |
| JP | 2000-049766 | 2/2000 |
| JP | 2001-197055 | 1/2001 |
| JP | 2001103571 | 1/2001 |
| JP | 2001-147849 | 5/2001 |
| JP | 2002-585884 | 10/2002 |
| JP | 2004-48139 | 2/2004 |
| KR | 1020030059303 | 7/2003 |
| WO | 94/12938 | 6/1994 |
| WO | 96/36934 | 11/1996 |
| WO | 9741661 | 11/1997 |
| WO | 9834374 | 8/1998 |
| WO | 9905814 | 2/1999 |
| WO | 9906900 | 2/1999 |
| WO | 9917564 | 4/1999 |
| WO | 99/27678 | 6/1999 |
| WO | 9927678 | 6/1999 |
| WO | 9963709 | 12/1999 |
| WO | 9964946 | 12/1999 |
| WO | 0031931 | 6/2000 |
| WO | 0069114 | 11/2000 |
| WO | 0072506 | 11/2000 |
| WO | 0101644 | 1/2001 |
| WO | 01/16933 | 3/2001 |
| WO | 01/24434 | 4/2001 |
| WO | 0141353 | 6/2001 |
| WO | 0163386 | 8/2001 |
| WO | 0171608 | 9/2001 |
| WO | 0178491 | 10/2001 |
| WO | 02101580 | 12/2002 |
| WO | 02102009 | 12/2002 |
| WO | 03005636 | 1/2003 |
| WO | 03007570 | 1/2003 |
| WO | 03009561 | 1/2003 |
| WO | 03015367 | 2/2003 |
| WO | 03007550 | 9/2003 |
| WO | 03079627 | 9/2003 |
| WO | 03079628 | 9/2003 |

OTHER PUBLICATIONS

Syverson, "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.
Dusse et al., "S/MIME Version 2 Message Specification," Mar. 1998, pp. 1-37.
Hoffman, "Enhanced Services for S/MIME," Database IETF RFC online IETF, RFC 2634, Jun. 1999, pp. 1-58 (Chapter 3, pp. 24-32), XP002220386.
Schumacher, "AutoPGP FAQ, Version 1" Internet Newsgroup, (Apr. 19, 1994), XP002230742.
Levien, "Protecting Internet E-Mail from Prying Eyes," Data Communications, McGraw Hill, New York, US, vol. 25, No. 6 (May 1, 1996), pp. 117-118, 120, 122), XP000587586.
Dusse et al., "S/MIME Version 2 Certificate Hanlding" Database IETF RFC Online IETF, RFC 2312, Mar. 1998, pp. 1-20 (Chapter 2.1, Chapter 4.1 ), XP002220385.
Hametvaara, "Certificate Management in Mobile Devices," Master's Thesis, University of Tampere, May 14, 2002.
Brown, Ian, et al., "A Proxy Approach to E-mail Security," Softwar Proctice & Experience, John Wiley & Sons Ltd., Chicester, GB, vol. 29, No. 12 pp. 1049-1060, Oct. 1999.
Subramanyam, "Security in Mobile Systems," Reliable Distributed Systems, 1998 Proceedings, 17th IEEE Symposium W. Lafayette IN, USA, Oct. 20-23, 1998, Los Alamitos, CA, USA, IEEE Comput. Soc., USA, pp. 407-412, Oct. 20, 1998.
Lai, "A Mobile Subscriber Proxy Preserving Writer-to-reader Message Security," Military Communications Conference Proceedings, IEEE McLean, VA, USA Oct. 21-24, 1996, New York, NY, USA, IEEE, pp. 461-467, Oct. 21, 1996.
Cole, "An Architecture for a Mobile OSI Mail Access System," IEEE Journal on Selected Areas in Communications, IEEE Inc., New York, USA, vol. 7, No. 2, pp. 249-256, Feb. 1989.
Harris, "Content Privacy and Content Security Working Together," Internet Article, Content Technologies White Paper, pp. 1-10, Sep. 1999.
Torvinen, "Wireless PKI: Fundamentals," Internet Article, Radicchio White Paper, pp. 1-15 (2000).
Mambo, "Proxy Signatures: Delegation of the Power to Sign Messages," IEICE Transactions on Fundamentals of Electronics, Communications and Computer Sciences, IEICE Tokyo, Japan, vol. E79-A, No. 9, pp. 1338-1354, Sep. 1, 1996.
Brown et al, "PGP in Constrained Wireless Devices," Proceedings of the 9th Usenix Security Symposium, Denver, CO, USA, pp. 247-261, Aug. 14-17, 2000.
Berson T et al, "Cryptography as a Network Service" 8th Annual Symposium on Network and Distributed System Security. (NDSS'01) InternetSoc Reston, VA, USA, Feb. 7-9, 2001, pp. 1-12, XP0002551706.
Butrico M et al, "Enterprise Data Access From Mobile Computers: An End-To-End Story" Research Issues in Data Engineering, 2000. RIDE 2000. Proceedings, Tenth Intemation Workshop on Sand Diego, CA, USA Feb. 28-29, 2000, Los Alamitos, CA, USA, IEEE Comput. Soc, US, Feb. 28, 2000, pp. 9-16, XP010377083.
Chadwick, D.W. et al. "Modifying LDAP to Support X.509-based PKIs", in Seventeenth Annual IFIPWG 11.3 Working Conference on Database and Applications Security at Estes Park, Colorado, Aug. 2003.
Deroest J, "Ubiquitous Mobile Computing" Sunexpert Magazine, Jul. 1998, pp. 54-56, SP002213003 Retrived from http://swexpert.com/C8/SE.C8.JUL.98.pdf on Sep. 10, 2002.
Housely, R et al. "Internet X.509 Public Key Infrastructure Certificate and CRL Profile (RFC 2459)", Jan. 1999.
ITU-T, "Information Technology—Open Systems Interconnection—The Directory: Public-Key and Attribute Certificate Frameworks", Mar. 2000.
Jin Jing et al: "Client-Server Computing in Mobile Environments" ACM Computing Surveys, Jun. 1999, AMC, USA, vol. 31, No. 2, pp. 117-157, XP002212945.
Myers, M. et al., "Certificate Management Messages over CMS (RFC 2797)", Apr. 2000.
Myers, M. et al., X.509 Internet Public Key Infrastructure Online Certificate Status Protocol—OSCP, RFC2560, Jun. 1999.
Nakajima T et al, "Adaptive Continuous Media Applictions in Mobile Computing Environments" Multimedia Computing Systems '97. Proceedings, IEEE Internations Conference in Ottawa, ON, Canada, Jun. 3-6, 1997, Los Almitos, CA, USA IEEE Comput. Soc. US, Jun. 3, 1997, pp. 152-160. XP010239184.
Ramsdell, D. et al. "Secure/Multipurpose Internet Mail Extensions (S/MIME) Version 3.1 Certificate Handling (RFC 3850)", Jul. 2004, Research in Motion Limited, BlackBerry Security with the S/MIME Support Package, version 1.5, Dec. 17, 2003.
BlackBerry Security with the S/MIME Support Package version 1.5, 2003.
Russell S, "Fast Checking of Individual Certificate Revocation on Small Systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US, Dec. 6, 1999, pp. 249-255, XP010368617.

(56) References Cited

OTHER PUBLICATIONS

Wasley D.L. et al, "Improving Digital Credential Management in Browsers" Internet Article. HEPKI-TAG Recommendation, Jul. 21, 2000, XP002213004 Retrieved from: http://middleware.internet2.edu/hepk i -tag/HEPKI-TAG-Certs-Browser-03.pdf on Sep. 10, 2002.

Zollner J, "Gateways to Overcome Incompatibilities of Security Mechanisms" Reliable Distributed Systems, 1999. Proceedings of the 19th IEEE Symposium, Lausanne, Switzerland, Oct. 19-22, 1999, Los Alamitos, Cal, USA, IEEE Comput. Soc. US Oct. 19-22, 1999 pp. 372-377, XP010357040 ISBN: 978-0-7695-0290-8.

Stallings, W, "S/MIME: E-Mail Gets Secure" Byte, McGraw-Hili Inc., St. Peterborough, US, vol. 23, No. 7, Jul. 1998, pp. 11-42, XP000774260.

Crocker S. et al, "MIME Object Security Services; RFC 1848.txt". IETF Standard, Internet Engineering Task Force, IETF, CH, Oct. 1995, XP0105007633.

Katsuro Inaya, et al., "Use Windows CE Now", ASCII, Oct. 1, 1999, vol. 23, No. 10, pp. 266-285.

Hiroyuki Sawano, Create a Secure Electronic Mail Environment with S/MIME!, @IT Security & Trust, May 30, 2001, http://www.atmarkit.co.jp/fsecurity/special/04smime/smime01.html.

Blom et al., "Conversational IP Multimedia Security", 4th International Workshop on Mobile and Wireless Communications Network, Sep. 9-11, 2002, pp. 147-151.

Fumy et al, Principles of Key Management, IEEE Journal on Selected Areas in Communications, VDI, 11, No. 5, Jun. 1999, pp. 785-793.

Eskicioglu et al. "A Key Transport Protocol Based on Secret Sharing Applications to Information Security", IEEE Transactions on Consumer Electronics, vol. 46, No. 4 Nov. 2002, pp. 816-824.

Kotzanikoloau et al, "Hybrid Key Establishment for Multiphase Self-Organized Sensor Networks", 6 IEEE International Symposium on a World of Wireless Mobile and Multimedia Networks, Jun. 13-16, 2005, pp. 581-587.

Research in Motion Limited, BlackBerry Security White Paper Release 4.0. 2005.

Kiely, Don, SQL Server 2005 Secures Your Data Like Never Before, Sep. 29, 2005. http://www.devx.com/codemag/Article/29351?trk=DXESS_DB.

Encrypt Pre-shared Keys in Cisco IOS Router Configuration Example, Document ID 46420 Cisco Systems, http://www.cisco.com/en/US/tech/tk5S3/tk3721technologies_configuration_example09186a00801f2336.shtml, 2006.

Policht, Martin, SQL Server 2005 Security—Part 3 Encryption, Database Journal, http://www.databasejournal.com/features/mssql/article/php/34S3931.

\* cited by examiner

SERVER VERIFICATION OF SECURE ELECTRONIC MESSAGES

TECHNICAL FIELD

The present invention relates generally to an electronic messaging system that is capable of processing encoded messages and information. In particular, the disclosure is directed to a system in which an electronic message server performs at least a portion of the verification functions typically performed by a mobile wireless communications device having secure electronic messaging capability, especially where an encoded message is too large for verification on the mobile wireless communications device.

BACKGROUND

Exchanging cryptographically encoded secure electronic messages and data, such as, for example, e-mail messages, is well known. In many known electronic message exchange schemes, signatures, encryption or both are commonly used to ensure the integrity and confidentiality of information being exchanged between a sender and a recipient of the electronic messages. In an e-mail system, for example, the sender of an e-mail message may either sign the message, encrypt the message or both sign and encrypt the message. These actions may be performed using well-known standards, such as, for example, Secure Multipurpose Internet Mail Extensions (S/MIME), Pretty Good Privacy™ (PGP™), OpenPGP, and numerous other secure e-mail standards.

In general, secure e-mail messages are relatively large. For example, S/MIME can increase the size of an e-mail message by a factor of ten or more in some situations. This size augmentation presents difficulties, especially in devices that have a limit on the size of a message that can be processed, such as, for example, a mobile wireless communications device. Such a device may also experience difficulty handling a message wherein only a portion of the message has been transferred to the device because of the above-mentioned size limitations.

For example, if a message is larger than the size limit of the device, then the entire message will never reach the device. If this large message is a signed or encoded message, then all the data required to verify the signature may not be sent to the device, and thus, the device may not be able to verify the signature.

SUMMARY

In view of the foregoing, we have now identified an efficient and easy to implement system and method for verifying secure electronic messages, wherein some of the processing overhead associated with decoding and/or verifying secure messages is distributed from a device having a size limit, such as, for example, a mobile wireless communications device, to a device having the ability to process much larger size messages, such as, for example, a server within the wireless communications system.

According to an exemplary embodiment of the present disclosure, a server within the wireless communications system has the ability to determine if a secure message is too large to be verified on a size-limited device. The server may make this determination by finding the point in the secure electronic message encoding where the message will be cut off due to the size constraints of the size-limited device. The server determines if the cut off point occurs in such a location that verification of the message will not be possible on the size-limited device, such as, for example, part way through the signed data or in the middle of the signature data. If the message is determined to be too long such that verification on the device is not possible, then the server can attempt to verify the signature on the message.

According to an exemplary embodiment of the disclosure, the server is operable to assist the size-limited device in verifying the message itself. For example, if a secure (e.g., signed and/or encrypted) message that is too large for the size-limited device is made up of three parts, A, B and C, where B is an attachment, the server may remove the attachment B from the message. Consequently, the attachment B will not be sent to the size-limited device. Because the attachment has been removed from the electronic message, the size-limited device will be unable to verify the signature. In order to assist the size-limited device in verifying the message, the server may apply a hashing function to parts A, B and C, in sequence. After each part has been hashed, the hashing function has a context associated therewith. The size-limited device, of course, only has parts A and C, so when it performs a hash, it will have the same context after hashing part A, but will have the incorrect starting context when it hashes part C. In a preferred embodiment, the hashing function applied to parts A, B and C may be the same as that used in signature generation.

In this situation, the server can insert the hash context after it hashed part A and the hash context after it hashed part B in place of the attachment B in the original message. Because the hash contexts are much smaller than the application data, the size-limited device should be able to accept this data. Accordingly, after the size-limited device performs its hash of part A, it can compare the hash context obtained from hashing part A with the hash context received from the server when it hashed part A. If these contexts match, the device can then substitute the hash context received from the server after it hashed part B, and the device can then continue to hash part C. This result can then be used to verify the signature.

In another exemplary embodiment of the disclosure, the server could alternatively insert the result of performing an exclusive OR function (XOR) of the context after hashing part A with the context after hashing part B. The device would then perform a hash of part A, take this context and perform an XOR with the value the server provides. The device then takes the result of that XOR function and uses it as the context after hashing part B. This alternative further reduces the amount of data required to be sent to the size-limited device.

As a further alternative exemplary embodiment, the server may only verify levels of the message. For example, in S/MIME the actual steps involved in verifying a message involve taking multiple digests and then performing an actual signature verification calculation. In this embodiment, the server may verify that the digests match, but leave the signature verification calculation to the size-limited device.

The foregoing exemplary embodiments provide a solution to the problem of verifying secured electronic messages by a size-limited device by distributing the processing overhead to a server of the electronic messaging system, thereby enabling the sharing of system resources to assist the size-limited device in verifying secured electronic messages.

The advantages attendant with the various embodiments of the invention described above are provided by the method and system of automated key management disclosed and described herein with reference to the drawings.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which.

DETAILED DESCRIPTION

Figure 1:
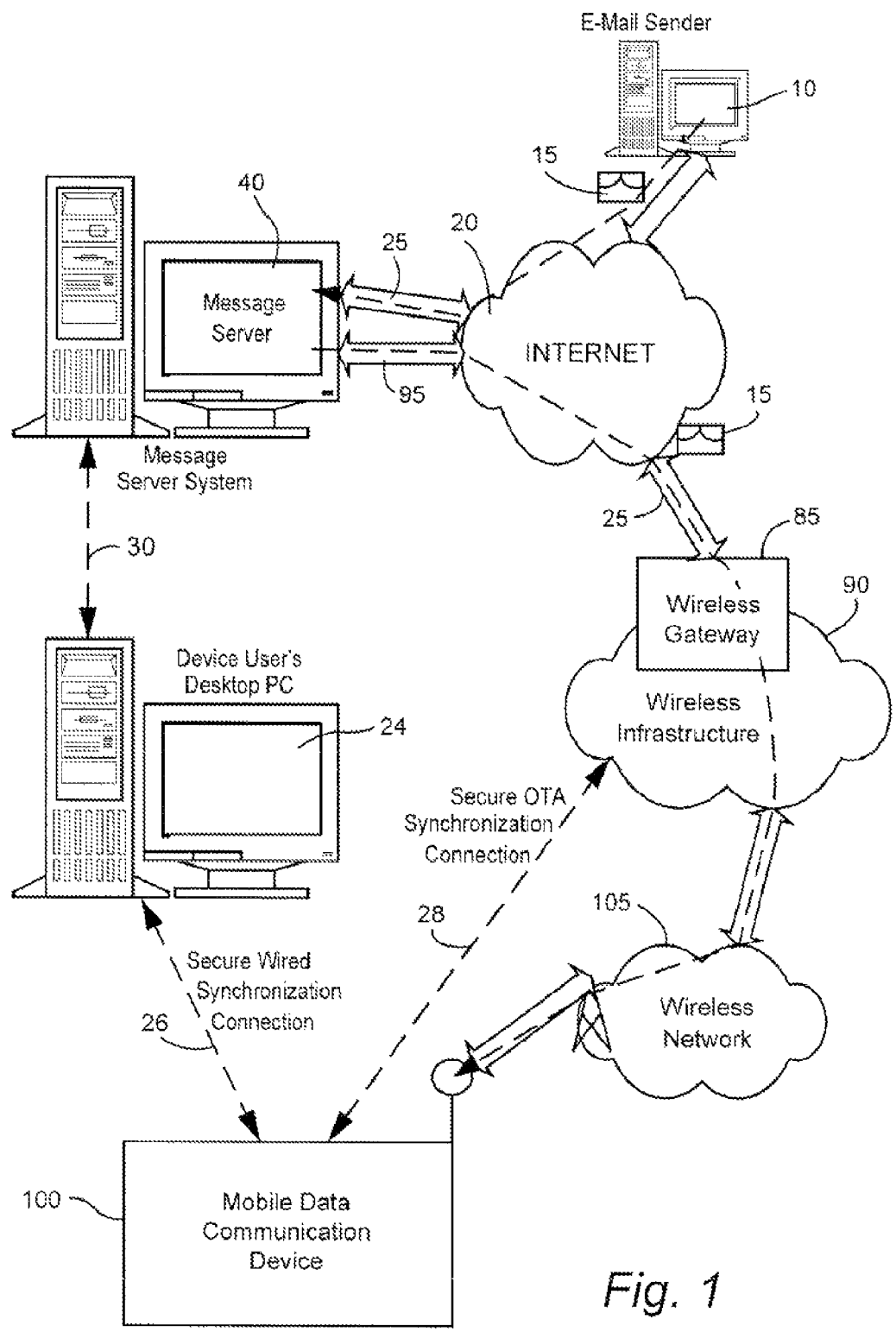
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online® (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
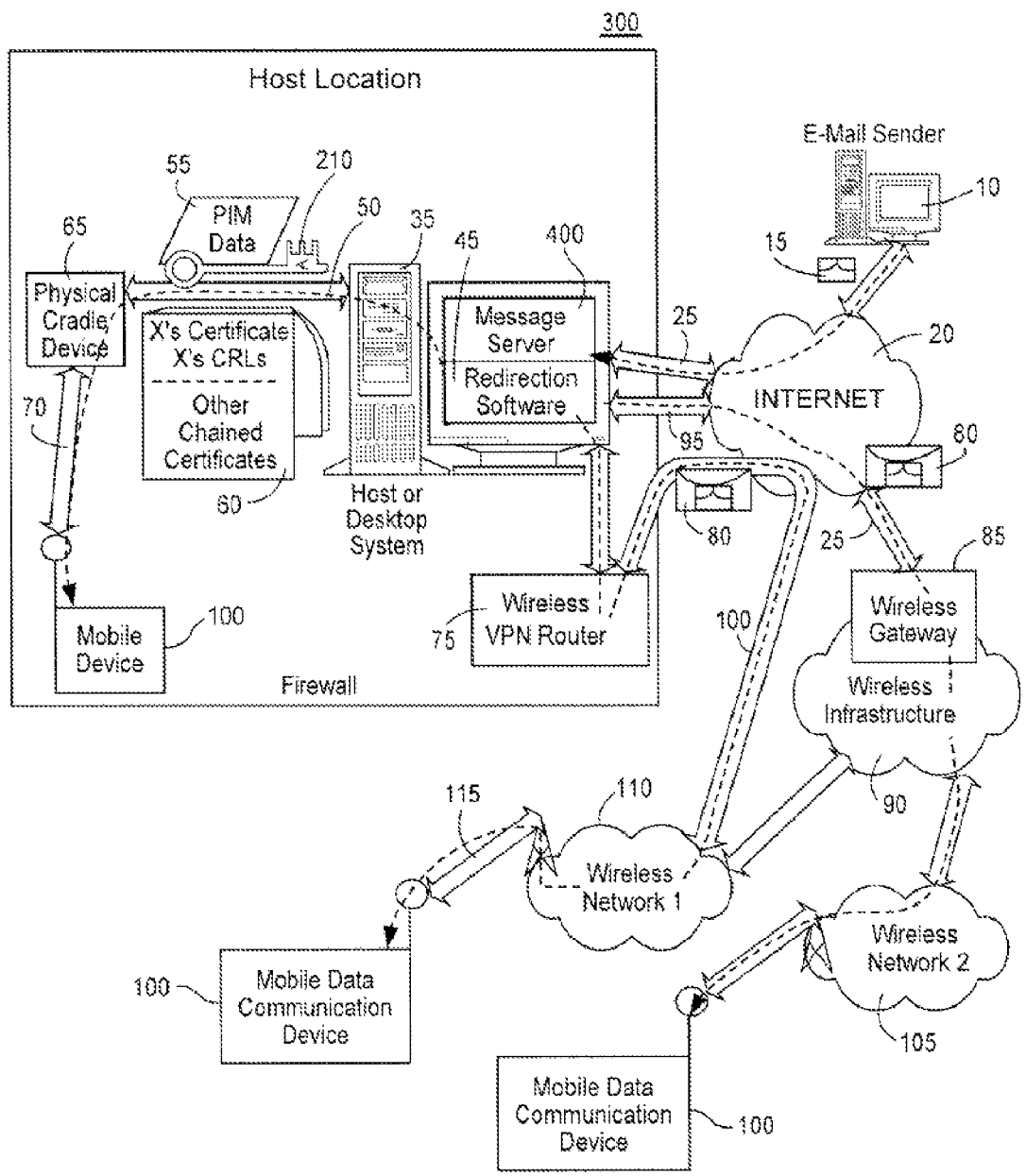
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
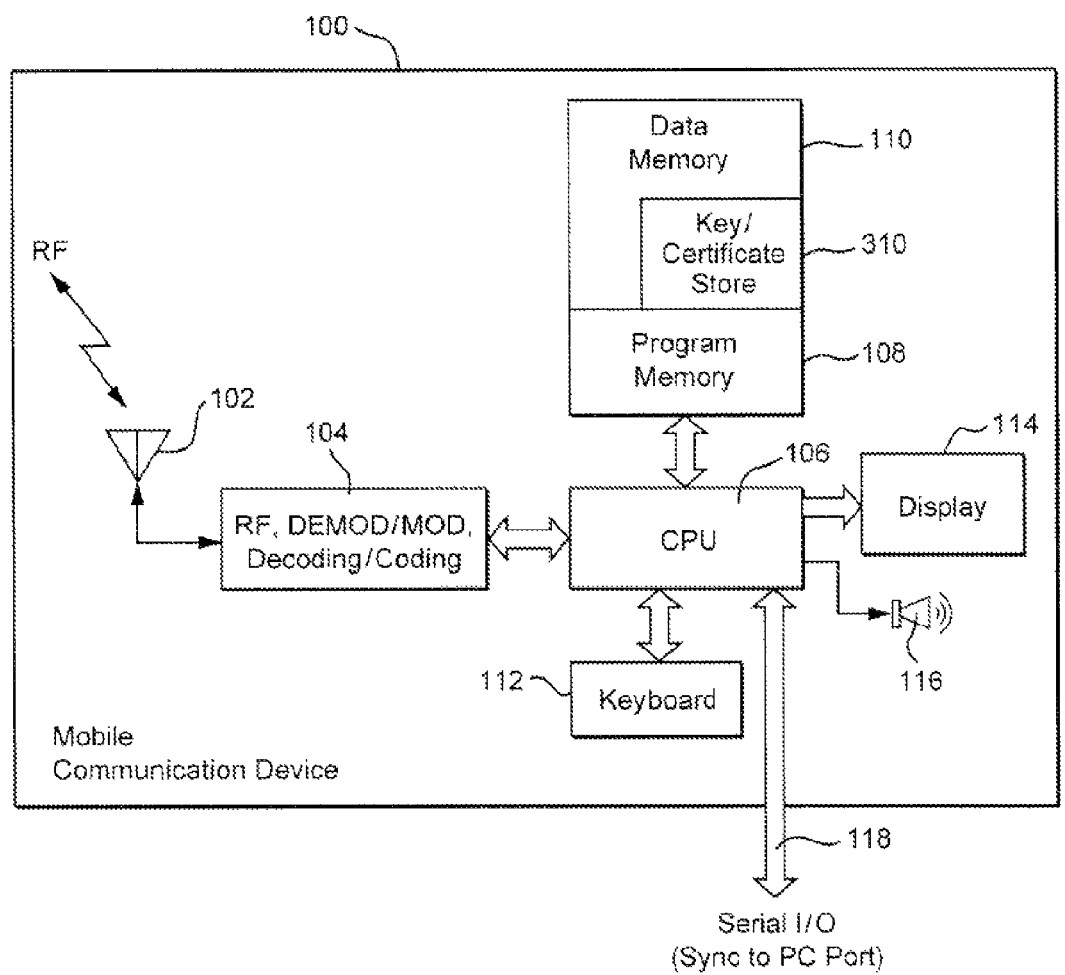
FIG. 3 is an illustrative schematic block diagram of an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign™ or Entrust®, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 4:
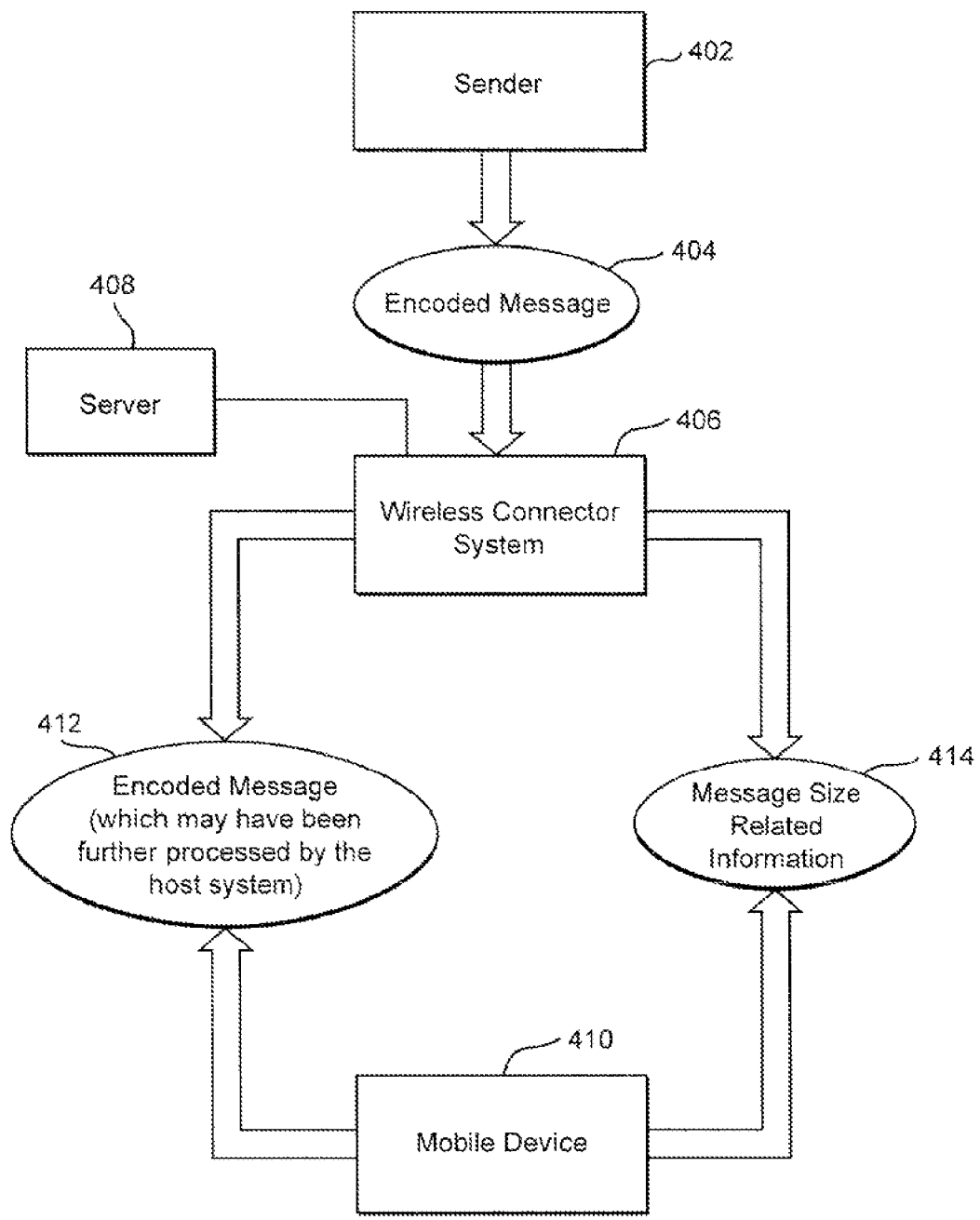
FIG. 4 is a block diagram depicting components used in handling encoded messages.

FIG. 4 illustrates a situation where encoded messages are provided to a mobile device 410 by a server 408 contained within a wireless connector system 406. With reference to FIG. 4, an encoded message 404 from a sender 402 is provided to the wireless connector system 406. The server 408 within the wireless connector system 406 analyzes the encoded message 404 with respect to its size. If the size is determined to be above some predetermined threshold, then the server 408 may notify the mobile device 410 with size related information 414. The server may process the encoded message 412 before sending it to the mobile device such that the encoded message 412 is below the predetermined threshold size. Moreover, data item 412 may be further processed by the server 408 such that the message is partially decoded and the result of such processing sent to the mobile device 410.

As an exemplary operational scenario, current mobile device implementations typically have a limit on the message size that will reach the mobile device, such as, for example, 32 KB. If an S/MIME message is over 32 KB, then the entire message will not completely reach the mobile device. As such, if the message is signed, then it cannot be verified on the mobile device due to the size limitation. The server in this situation may send an indication to the mobile device that the message is too large to be verified by the mobile device and that verification has already been done by the server. The user receiving this message will then be aware that verification of the message has already been accomplished.

Figure 5:
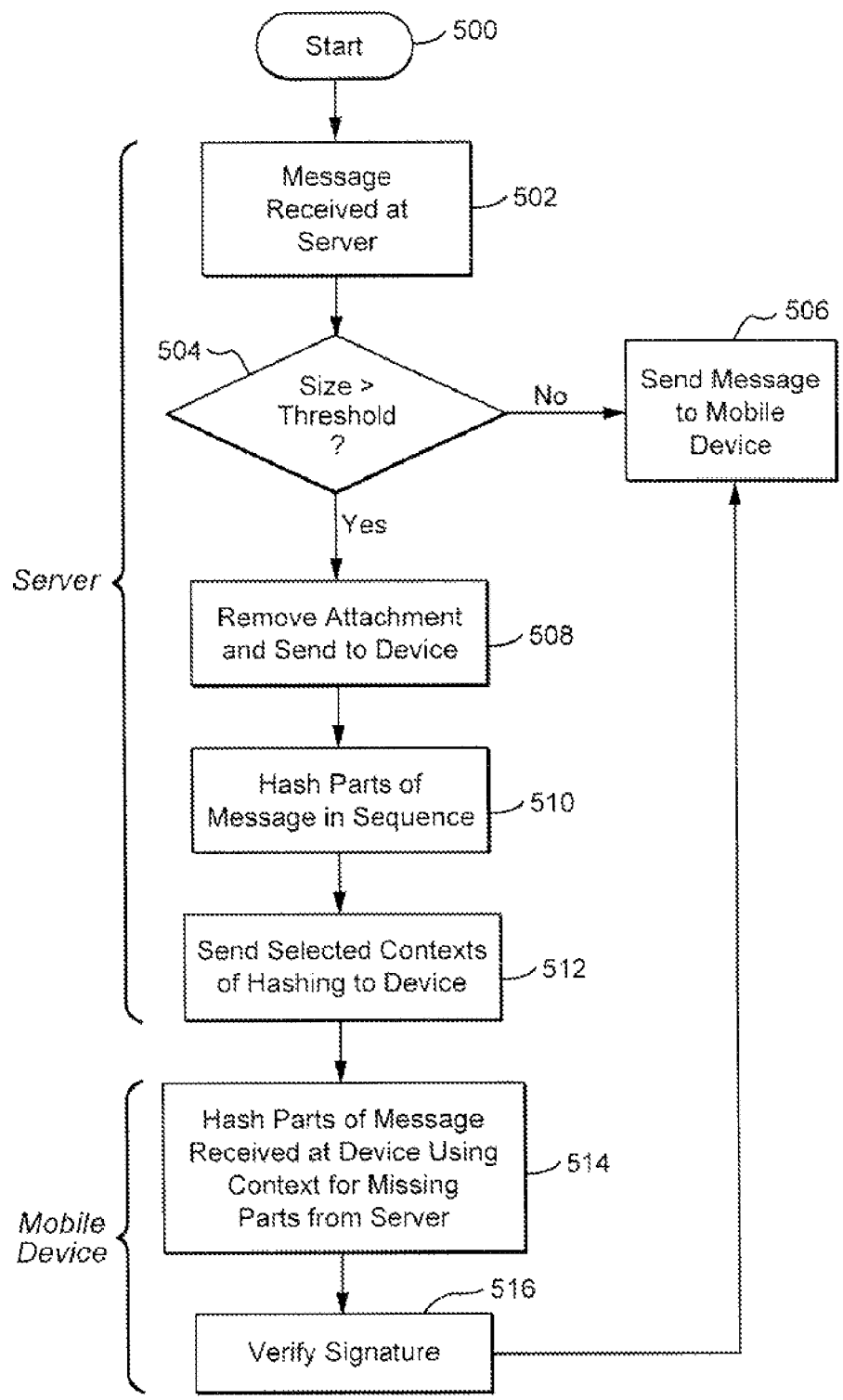
FIG. 5 is an illustrative flow diagram of an exemplary operational scenario for processing encoded messages according to an exemplary embodiment of the invention.

According to an exemplary embodiment of the present invention, as illustrated in FIG. 5, the server is operable to assist the size-limited mobile device in verifying the message itself. As an operational illustrative example, a secure (e.g., signed) message that is too large for the size-limited device may be made include an attachment. Start indication block 500 indicates that process block 502 has received a message at the server. Decision block 504 examines the message to determine if the size is above a predetermined threshold. The message size includes the size of any attachments that may be present. If the message size is not above the predetermined threshold, the message is provided to the size-limited device 506 after the server has performed any additional customary processing of the message. If the message is too large for the size-limited device, the server may perform additional steps to assist the size-limited device in verifying the message. For example, the server determines the point in the secure electronic message encoding where the message will be cut off due to the size constraints of the size-limited device. The server determines if the cut off point occurs in such a location that verification of the message will not be possible on the size-limited device, such as, for example, part way through the signed data or in the middle of the signature data. If the message is determined to be too long such that verification is not possible on the device, then the server can attempt to verify the signature on the message.

As an operational example, assume that the message data is made up of three parts, A, B and C, where B is a large attachment. After determining that the message is too large for the size-limited device, the server may remove the attachment B from the message to prevent it from being sent to the size-limited device 508. Consequently, the attachment B will not be sent to the size-limited device. Because the attachment has been removed from the electronic message, the size-limited device will be unable to verify the signature. In order to assist the size-limited device in verifying the message, the server may apply a hashing function to parts A, B and C, in sequence 510. In a preferred embodiment, the hashing function applied to parts A, B and C is the same as that used in signature generation. After each part has been hashed, the hashing function has a context associated therewith. The size-limited device, of course, only has parts A and C, so when it performs a hash, it will have the same context after hashing part A, but will have the incorrect starting context when it hashes part C.

In this situation, the server can insert the hash context after it hashed part A and the hash context after it hashed part B in place of the attachment B in the original message 512. Because the hash contexts are much smaller than the application data, the size-limited device should be able to accept this data. Accordingly, after the size-limited device performs its hash of part A, it can compare the hash context obtained from hashing part A with the hash context received from the server when it hashed part A. If these contexts match, the device can then substitute the hash context received from the server after it hashed part B, and the device can then continue to hash part C 514. This result can then be used to verify the signature 516.

Figure 6:
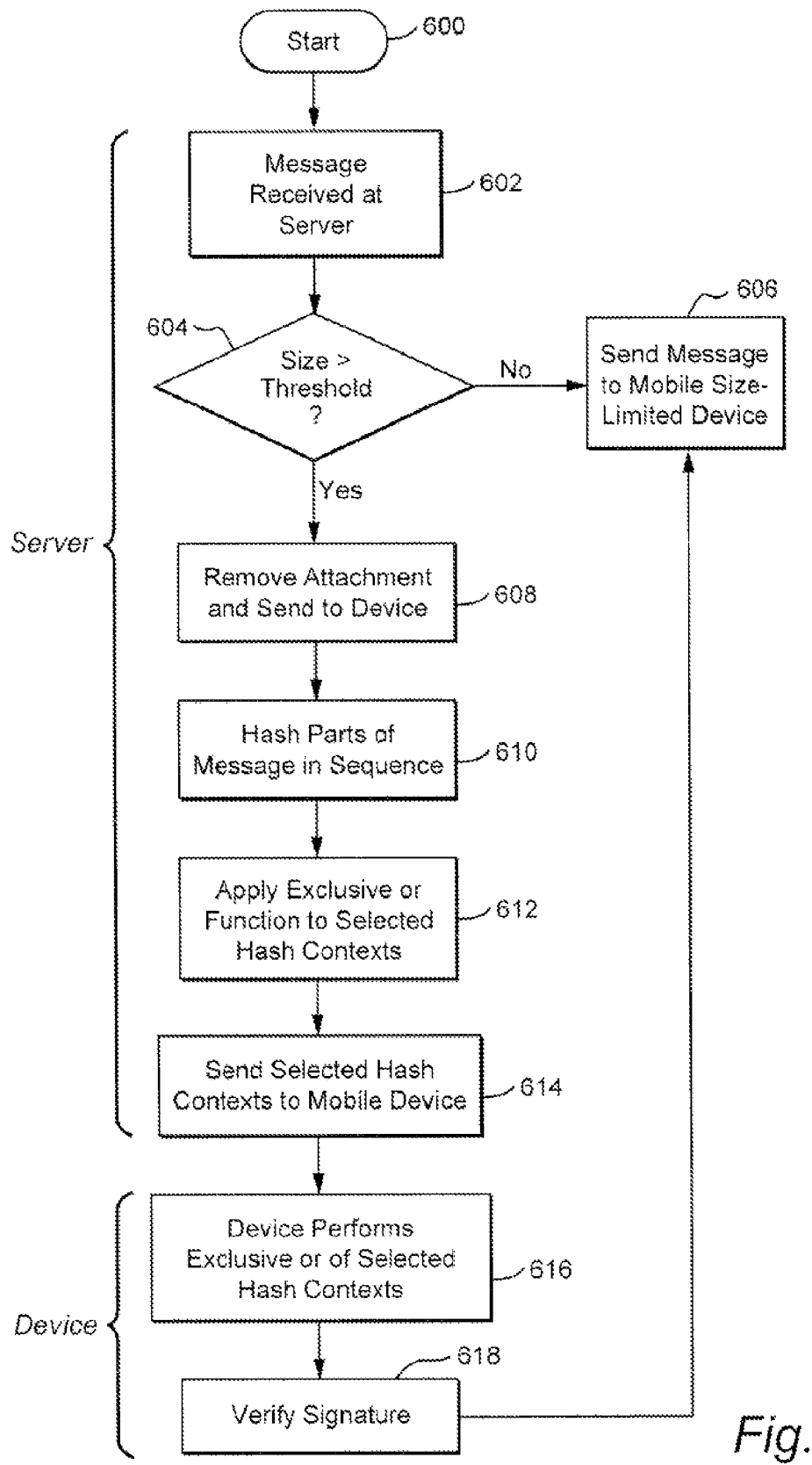
FIG. 6 is an illustrative flow diagram of an alternative exemplary operational scenario according to another exemplary embodiment of the present invention.

Another example is illustrated in FIG. 6. In this example, steps 600, 602, 604, 606, 608 and 610 correspond substantially to steps 500, 502, 504, 506, 508 and 510 of FIG. 5. According to this example, the server could alternatively insert the result of performing an exclusive OR function (XOR) of the context after hashing part A with the context after hashing part B 612. The device would then perform a hash of part A, take this context and perform an XOR with the value the server provides for the context after hashing part B 614. The device then takes the result of that XOR function and uses it as the context after hashing part B 616, to verify the signature 618. This alternative further reduces the amount of data required to be sent to the size-limited device.

As yet another example, the server may only verify levels of the message. For example, in S/MIME the actual steps involved in verifying a message involve taking multiple digests and then performing an actual signature verification calculation. In this exemplary embodiment, the server may verify that the digests match, but leave the signature verification calculation to the size-limited device.

While the foregoing has been described in conjunction with specific exemplary embodiments, it is evident that many alternatives, modifications and variations will be apparent to those skilled in the art. Accordingly, the exemplary embodiments set forth herein are intended to be illustrative, not limiting. Various changes may be made without departing from the true spirit and full scope of the invention as defined in the appended claims.

What is claimed is:

1. A non-transitory computer readable medium having stored thereon instructions which, when executed by a processor comprised in a server, result in:
receiving a digitally signed message comprising at least a first message part and a second message part, the first message part immediately preceding the second message part in the message;
removing the first message part from the message;
sending, to a mobile device, the message comprising the second message part and with the first message part removed;
applying a hashing function to the first message part;
after applying the hashing function to the first message part, determining a hash context of the hashing function associated with the first message part; and
sending the hash context of the hashing function associated with the first message part to the mobile device, wherein the hash context of the hash function associated with the first message part is usable by the mobile device as a starting context for hashing the second message part at the mobile device.

2. The non-transitory computer readable medium of claim 1, wherein the message comprises a third message part immediately preceding the first message part in the message, and wherein the instructions, when executed by the processor at the server, further result in:
applying the hashing function to the third message part;
after applying the hashing function to the third message part, determining a hash context of the hashing function associated with the third message part; and
sending the hash context of the hashing function associated with the third message part with the hash context of the hashing function associated with the first message part to the mobile device, wherein the hash context of the hashing function associated with the third message part is usable by the mobile device for comparison with a device-computed hash context for the third message part,
wherein the first message part is used by the mobile device as a starting context for hashing the second message part at the mobile device after determining that the hash context of the hashing function associated with the third message part matches the device-computed hash context for the third message part.

3. The non-transitory computer readable medium of claim 2, wherein the hash context of the hashing function associated with the third message part and the hash context of the hashing function associated with the first message part are sent with the message to the mobile device, in place of the first message part.

4. The non-transitory computer readable medium of claim 2, wherein the message comprises a digital signature, and wherein the hashing function applied to the third message part is identical to a hashing function used to generate the digital signature.

5. The non-transitory computer readable medium of claim 1, wherein the instructions, when executed by the processor at the server, further result in:
determining a size of the digitally signed message received;
if the size is not above a threshold, sending the message to the mobile device without removing the first message part; and
if the size is above the threshold, removing the first message part, sending the message comprising the second message part and with the first message part removed to the mobile device, applying the hashing function to the first message part, determining the hash context and sending the hash context to the mobile device.

6. The non-transitory computer readable medium of claim 1, wherein the message comprises an attachment, and wherein the first message part comprises the attachment.

7. The non-transitory computer readable medium of claim 1, wherein the message comprises a digital signature, and wherein the hashing function applied to the first message part is identical to a hashing function used to generate the digital signature.

8. A non-transitory computer readable medium having stored thereon instructions which, when executed by a processor comprised in a mobile device, result in:
- receiving, from a server, a message comprising at least a second message part and a digital signature, wherein a first message part that immediately preceded the second message part in the message as received by the server has been removed from the message by the server;
- receiving a hash context of a hashing function associated with the first message part;
- hashing the second message part of the message using the hash context of the hashing function associated with the first message part as a starting context for hashing the second message part; and
- verifying the digital signature after hashing the second message part of the message.

9. The non-transitory computer readable medium of claim 8, wherein the message comprises a third message part, and wherein the instructions, when executed by the processor comprised in the mobile device, further result in:
- receiving, from the server, a hash context of the hashing function associated with the third message part with the hash context of the hashing function associated with the first message part;
- hashing the third message part;
- computing a device-computed hash context for the third message part after hashing the third message part;
- comparing the hash context of the hashing function associated with the third message part with the device-computed hash context for the third message part; and
- performing hashing of the second message part of the message and verifying the digital signature, after determining that the hash context of the hashing function associated with the third message part matches the device-computed hash context for the third message part.

10. The non-transitory computer readable medium of claim 9, wherein the third message part immediately preceded the first message part in the message as received by the server, and wherein the hash context of the hashing function associated with the third message part and the hash context of the hashing function associated with the first message part are received with the message at the mobile device, in place of the first message part.

11. The non-transitory computer readable medium of claim 9, wherein the hashing function applied to the third message part is identical to a hashing function used to generate the digital signature.

12. The non-transitory computer readable medium of claim 8, wherein the second message part is hashed using a hashing function identical to a hashing function used to generate the digital signature.

13. A mobile device comprising:
- a processor;
- memory coupled to the processor, the memory to store data required for decrypting encrypted messages;
- a wireless network communication interface coupled to the processor, the wireless network communication interface operative to receive a message from a server, the message comprising at least a second message part and a digital signature, wherein a first message part that immediately preceded the second message part in the message as received by the server has been removed from the message by the server, and operative to receive from the server a hash context of a hashing function associated with the first message part,
- wherein the processor is operative to hash the second message part using the hash context as a starting context for hashing the second message part, and the processor is operative to verify the digital signature after hashing the second message part.

14. The mobile device of claim 13, wherein the message comprises a third message part, the wireless network communication interface is operative to receive from the server a hash context of the hashing function associated with the third message part, and the processor is operative to:
- hash the third message part;
- compute a device-computed hash context for the third message part after hashing the third message part;
- compare the hash context of the hashing function associated with the third message part received from the server with the device-computed hash context for the third message part; and
- perform hashing of the second message part and verifying the digital signature after determining that the hash context of the hashing function associated with the third message part received from the server matches the device-computed hash context for the third message part.

15. The mobile device of claim 14, wherein the third message part immediately preceded the first message part in the message as received by the server, and wherein the hash context of the hashing function associated with the third message part and the hash context of the hashing function associated with the first message part are received with the message at the mobile device, in place of the first message part.

16. The mobile device of claim 14, wherein the hashing function applied to the third message part is identical to a hashing function used to generate the digital signature.

17. The mobile device of claim 13, wherein the second message part is hashed using a hashing function identical to a hashing function used to generate the digital signature.

* * * * *